(12) United States Patent
Sato et al.

(10) Patent No.: US 10,500,912 B2
(45) Date of Patent: Dec. 10, 2019

(54) REAR FLAP CONFIGURATION FOR AMPHIBIOUS VEHICLE

(71) Applicant: MITSUBISHI HEAVY INDUSTRIES, LTD., Tokyo (JP)

(72) Inventors: Shinichi Sato, Tokyo (JP); Mitsuo Onoue, Tokyo (JP); Takashi Matsunaga, Tokyo (JP); Ryo Nakajima, Tokyo (JP); Takaaki Oshima, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/780,141

(22) PCT Filed: Jan. 20, 2017

(86) PCT No.: PCT/JP2017/001846
§ 371 (c)(1),
(2) Date: May 30, 2018

(87) PCT Pub. No.: WO2017/126643
PCT Pub. Date: Jul. 27, 2017

(65) Prior Publication Data
US 2018/0361809 A1 Dec. 20, 2018

(30) Foreign Application Priority Data

Jan. 21, 2016 (JP) .................................. 2016-009610

(51) Int. Cl.
*B60F 3/00* (2006.01)
*B63B 1/28* (2006.01)

(52) U.S. Cl.
CPC .......... *B60F 3/0046* (2013.01); *B60F 3/0038* (2013.01); *B63B 1/286* (2013.01); *Y02T 70/12* (2013.01); *Y02T 70/125* (2013.01)

(58) Field of Classification Search
CPC .... B63B 1/00; B63B 1/32; B63B 1/22; B63B 1/28; B63B 1/286; B63B 1/40; B60F 3/00;
(Continued)

(56) References Cited

U.S. PATENT DOCUMENTS

| 4,953,492 A * | 9/1990 | Duffty | B60F 3/0007 440/12.64 |
| 5,579,711 A * | 12/1996 | Thomas | B63B 39/061 114/285 |

(Continued)

FOREIGN PATENT DOCUMENTS

JP    2015-127182 A    7/2015

*Primary Examiner* — Lars A Olson
(74) *Attorney, Agent, or Firm* — Birch, Stewart, Kolasch & Birch, LLP

(57) ABSTRACT

A rear flap configuration for an amphibious vehicle includes a vehicle body, a pair of crawlers disposed on both right and left sides with respect to a traveling direction of the vehicle body, and a rear flap connected to a rear part of the vehicle body. The vehicle body has a rear surface including a departure angle surface which extends obliquely upward from a lower edge of the rear surface as the vehicle body extends rearward. The crawlers have upper surfaces positioned above the lower edge, lower surfaces positioned below the lower edge, and rear edges projecting rearward from the lower edge. The rear flap includes a flap body part having a facing edge which faces the lower edge between the crawlers and is vertically rotatably connected to the vehicle body so as to allow the facing edge to come into contact or close proximity with the lower edge.

13 Claims, 9 Drawing Sheets

(58) Field of Classification Search
CPC .... B60F 3/0007; B60F 3/0015; B60F 3/0038; B60F 3/0061; B60F 3/0046
USPC ............. 114/285, 284, 286; 440/12.63
See application file for complete search history.

(56) References Cited

U.S. PATENT DOCUMENTS

| | | | |
|---|---|---|---|
| 8,206,190 B2* | 6/2012 | Lee | B60F 3/0061 |
| | | | 440/12.63 |
| 8,997,676 B2* | 4/2015 | Chu | B63B 1/32 |
| | | | 114/285 |
| 2009/0124142 A1* | 5/2009 | Wernicke | B60F 3/0007 |
| | | | 440/12.63 |
| 2017/0158010 A1 | 6/2017 | Oshima | |

* cited by examiner

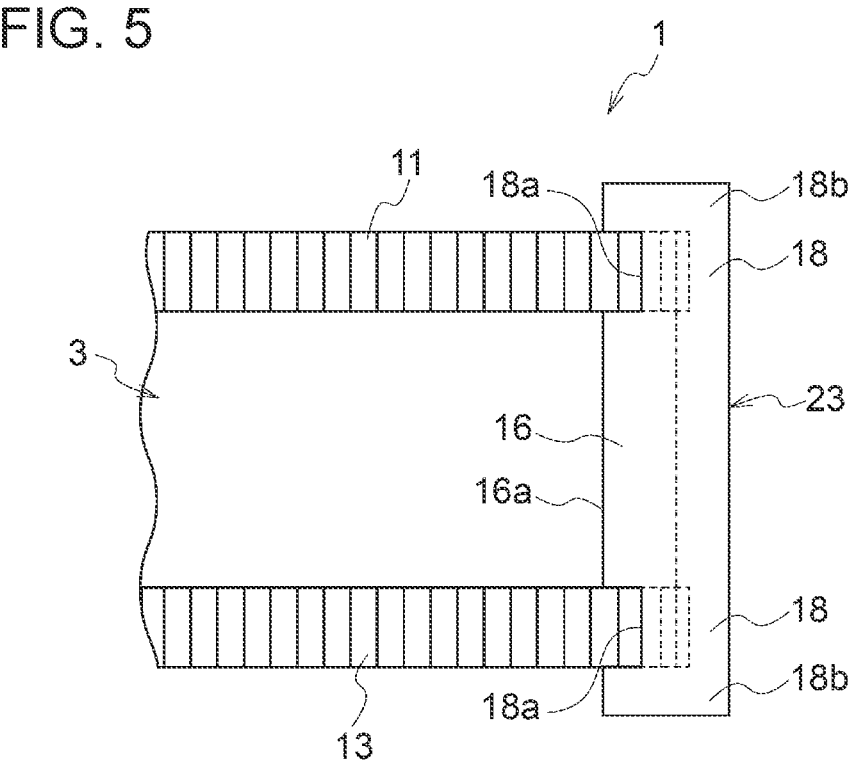

REAR FLAP CONFIGURATION FOR AMPHIBIOUS VEHICLE

TECHNICAL FIELD

The present disclosure relates to a rear flap configuration for an amphibious vehicle in which a rear flap is provided at a rear surface of a vehicle body.

BACKGROUND ART

Amphibious vehicles have a flattened vehicle bottom surface and a shortened length in a front-rear direction of the vehicle body in order to improve the running performance across rough terrain on land. Such amphibious vehicles cause the vehicle body to tilt backward due to waves created by a bow of the vehicle body during traveling on water. This increases the fluid resistance due to water applied to the vehicle body during traveling on water. Therefore, there is proposed an amphibious vehicle including a rear flap having one end fixed to a lower end portion of a structural plane of the vehicle body and extending to a rear side of the vehicle (see Patent Document 1).

The rear flap of the amphibious vehicle described in Patent Document 1 is mounted in a vertically rotatable manner via a hinge disposed at a lower part of a rear surface of the vehicle body, and is mounted at a predetermined angle with respect to the rear surface of the vehicle body, via an extendable and contractible support member which has one end fixed to a lower part of the vehicle body and the other end attached to the rear flap. The rear flap has substantially the same width as that of the vehicle body.

Accordingly, during traveling of the amphibious vehicle on water, since waves in water pass through rearward from a lower surface of the vehicle body via a lower surface of the rear flap, lift is applied from a lower side to an upper side of the rear surface of the vehicle body, and it is possible to decrease wave drag from a front surface of the vehicle body.

CITATION LIST

Patent Literature

Patent Document 1: JP2015-127182A

SUMMARY

Problems to be Solved

In order to cause such an amphibious vehicle to pass through a large step on land, it is necessary to provide an inclination surface with a departure angle to a rear part of the vehicle. In this case, if one intends to install a rear flap on the inclination surface at the rear part of the vehicle in which a pair of crawlers is disposed on both sides in a width direction of the vehicle body of the amphibious vehicle, and rear ends of the crawlers are located on substantially the same plane as the rear surface of the vehicle body, the crawlers disturb the installment. Then, if the rear flap is positioned behind the crawlers and mounted to the vehicle body, a gap is formed between the rear flap and the vehicle body, which causes waves in water to flow out from the gap between the rear flap and the vehicle body during traveling of the amphibious vehicle on water, thus reducing the performance of the rear flap.

At least one embodiment of the present invention has been made under such circumstances in the prior art. An object thereof is to provide a rear flap configuration for an amphibious vehicle that enables a rear flap to be mounted to a vehicle body, without forming a gap between a rear part of the vehicle body and the rear flap during traveling on water, in an amphibious vehicle having an inclination surface with a departure angle at a rear part of the vehicle and including a pair of crawlers disposed on both sides in a width direction of the vehicle body.

Solution to the Problems (1) A rear flap configuration for an amphibious vehicle according to at least one embodiment of the present invention comprises: a vehicle body; a pair of crawlers disposed on both right and left sides of the vehicle body with respect to a traveling direction of the vehicle body; and a rear flap connected to a rear part of the vehicle body, the vehicle body having a rear surface including a departure angle surface which extends obliquely upward from a lower edge of the rear surface as the vehicle body extends rearward, the pair of crawlers having an upper surface positioned above the lower edge and a lower surface positioned below the lower edge, the pair of crawlers having a rear edge projecting rearward from the lower edge, the rear flap including a flap body part having a facing edge which faces the lower edge between the pair of crawlers, the rear flap being vertically rotatably connected to the vehicle body so as to allow the facing edge to come into contact or close proximity with the lower edge.

The rear flap configuration for an amphibious vehicle described in the above (1) includes a vehicle body, a pair of crawlers disposed on both right and left sides of the vehicle body with respect to a traveling direction of the vehicle body, and a rear flap connected to a rear part of the vehicle body. The vehicle body has a rear surface including a departure angle surface which extends obliquely upward from a lower edge of the rear surface as the vehicle body extends rearward. The pair of crawlers has an upper surface positioned above the lower edge and a lower surface positioned below the lower edge, and the pair of crawlers has a rear edge projecting rearward from the lower edge. The rear flap includes a flap body part having a facing edge which faces the lower edge between the pair of crawlers, and the rear flap is vertically rotatably connected to the vehicle body so as to allow the facing edge to come into contact or close proximity with the lower edge. When the rear flap is rotationally moved in a vertical direction with respect to the vehicle body, the facing edge of the flap body part is brought into contact or close proximity with the lower edge of the vehicle body at a position between the pair of crawlers. Thus, the flap body part is not in contact with the crawlers, which makes it possible to locate the flap body part on the rear surface of the vehicle body without a gap or in close proximity. Consequently, the rear flap configuration for an amphibious vehicle enables the rear flap to be mounted to the vehicle body, without forming a gap between a rear part of the vehicle body and the rear flap during traveling of the amphibious vehicle on water.

(2) In some embodiments, in the rear flap configuration for an amphibious vehicle described in the above (1), the rear flap further includes a second flap body part positioned behind the flap body part and having second facing edges respectively facing the pair of crawlers, and the rear flap is configured so as to allow the second facing edges to come into contact or close proximity with the crawlers.

According to the embodiment described in the above (2), the rear flap further includes a second flap body part positioned behind the flap body part and having second facing edges respectively facing the pair of crawlers, and is configured so as to allow the second facing edges to come into contact or close proximity with the crawlers. Thus, when the second flap body part is rotationally moved such that the second facing edges come into contact or close proximity with the crawlers, it is possible to mount the second flap body part to the vehicle body without forming a gap between the second flap body part and the crawlers. Additionally, when the rear flap includes the flap body part and the second flap body part, it is possible to improve the lift generated by water flow along the bottom surface of the vehicle body that acts on the rear flap during traveling on water.

(3) In some embodiments, in the rear flap configuration for an amphibious vehicle described in the above (2), the second facing edges extend in a direction orthogonal to a rotational direction of the crawlers.

According to the embodiment described in the above (3), the second facing edges extend in a direction orthogonal to a rotational direction of the crawlers. Since the second facing edge is oriented in a direction orthogonal to a rotational direction of the crawler while a rear part of the crawler is curved, a distance between the crawler and the second facing edge in a longitudinal direction is made substantially constant. Thus, when the second facing edge is more closely approximated to the crawler, it is possible to eliminate a gap over the almost entire region in a longitudinal direction of the second facing edge. Consequently, it is possible to easily suppress water flowing out from the bottom surface of the vehicle body through a gap, during traveling on water.

(4) In some embodiments, in the rear flap configuration for an amphibious vehicle described in the above (2), the second facing edges extend in a direction intersecting with a rotational direction of the crawlers.

According to the embodiment described in the above (4), the second facing edges extend in a direction intersecting with a rotational direction of the crawlers. Since the second facing edge is oriented in a direction intersecting with a rotational direction of the crawler while a rear part of the crawler is curved, a distance between the crawler and the second facing edge in a longitudinal direction can be made irregular. Accordingly, when the direction of the second facing edge is designed such that the distance between the crawler and the second facing edge in a longitudinal direction is made substantially constant, it is possible to decrease the distance between the second facing edge and the crawler.

(5) In some embodiments, in the rear flap configuration for an amphibious vehicle described in the above (2) or (3), the second flap body part includes extension parts extending to outside of the pair of crawlers on both right and left sides.

According to the embodiment described in the above (5), the second flap body part includes extension parts extending to outside of the pair of crawlers on both right and left sides. Thus, it is possible to increase the pressure-receiving area of the second flap body part on which water flowing along the bottom surface of the vehicle body is applied to the second flap body part, during traveling on water. Consequently, it is possible to further increase the lift generated by the second flap body part.

(6) In some embodiments, the rear flap configuration for an amphibious vehicle described in any one of the above (1) to (5) further comprises an arm having a first end rotatably connected to the vehicle body and a second end connected to the flap body part.

According to the embodiment described in the above (6), the rear flap configuration further includes an arm having a first end rotatably connected to the vehicle body and a second end connected to the flap body part, which allows, during traveling on water, the arm to be rotationally moved downward such that the facing edge of the flap body part is in contact or close proximity with the lower edge of the vehicle body, and during traveling on land, the arm to be rotationally moved upward such that the flap body part is positioned at an upper part of the vehicle body. Thus, it is possible to generate the lift by the flap body part during traveling on water. Additionally, it is possible to eliminate a risk that the flap body part comes into contact with ground during traveling on land. Further, it is possible to eliminate a risk that the flap body part disturbs a person who gets on or off the vehicle from a rear surface of the vehicle body. Since claim 6 also refers to claim 2, the rear flap also includes the second flap body part. Thus, claim 6 includes a rear flap in which the flap body part can vertically rotationally moved via an arm, regardless of the presence or absence of the second flap body part.

(7) In some embodiments, in the rear flap configuration for an amphibious vehicle described in any one of the above (2) to (5), the second flap body part is formed separately from the flap body part, and the rear flap configuration further comprises an arm having a first end rotatably connected to the vehicle body and a second end connected to the second flap body part.

According to an embodiment described in the above (7), the second flap body part is formed separately from the flap body part. Additionally, the rear flap configuration further comprises an arm having a first end rotatably connected to the vehicle body and a second end connected to the second flap body part. This configuration allows, during traveling on water, the arm to be rotationally moved downward so that the second facing edges of the second flap body part are in contact or close proximity with the crawlers, and during traveling on land, the arm to be rotationally moved upward so that the second flap body part is positioned at an upper part of the vehicle body. Thus, it is possible to suppress the occurrence of gaps between the second facing edges of the second flap body part and the crawlers during traveling on water, and it is possible to suppress the lift caused by the second flap body part. Additionally, it is possible to eliminate a risk that the second flap body part comes into contact with ground during traveling on land. Further, it is possible to eliminate a risk that the second flap body part disturbs a person who gets on or off the vehicle from a rear surface of the vehicle body when the vehicle is in a stop state.

(8) In some embodiments, in the rear flap configuration for an amphibious vehicle described in the above (6) or (7), the rear flap includes an elastic member disposed along the facing edge, and the elastic member is configured such that the facing edge comes into contact with the lower edge via the elastic member when the rear flap is moved to a position having a predetermined flap angle with respect to a rear surface of the vehicle body.

According to the embodiment described in the above (8), the rear flap includes an elastic member disposed along the facing edge. Additionally, the elastic member is configured such that the facing edge comes into contact with the lower edge via the elastic member when the rear flap is moved to a position having a predetermined flap angle with respect to a rear surface of the vehicle body. Thus, it is possible to eliminate a gap by the elastic member, even if a gap is present between the facing edge and the lower edge, when the rear flap is moved to a position having a predetermined flap angle with respect to a rear surface of the vehicle body. Consequently, it is possible to reliably suppress a risk that water flowing out from a gap between the rear flap and the rear surface of the vehicle body, during traveling on water.

(9) In some embodiments, in the rear flap configuration for an amphibious vehicle described in the above (6) or (7), the second flap body part of the rear flap includes elastic members disposed along the second facing edges, and the elastic members are configured such that the second facing edges come into contact with the crawlers via the elastic members when the second flap body part is moved to a position having a predetermined flap angle with respect to a rear surface of the vehicle body.

According to the embodiment described in the above (9), the second flap body part of the rear flap is provided with elastic members disposed along the second facing edges. Additionally, the elastic members are configured such that the second facing edges come into contact with the crawlers via the elastic members when the second flap body part is moved to a position having a predetermined flap angle with respect to a rear surface of the vehicle body. Thus, it is possible to eliminate gaps by the elastic members, even if gaps are present between the second facing edges and the crawlers, when the second flap body part is moved to a position having a predetermined flap angle with respect to a rear surface of the vehicle body. Consequently, it is possible to reliably suppress a risk that water flowing out from a gap between the second flap body part and the crawlers, during traveling on water.

(10) In some embodiments, in the rear flap configuration for an amphibious vehicle described in the above (7), a rear edge of the flap body part positioned opposite to the facing edge is configured to come into contact or close proximity with a front edge of the second flap body part facing the rear edge, or the rear edge is configured to be positioned beneath the front edge of the second flap body part.

According to the embodiment described in the above (10), a rear edge of the flap body part positioned opposite to the facing edge is configured to come into contact or close proximity with a front edge of the second flap body part facing the rear edge. By bringing the rear edge and the front edge into contact or close proximity with each other, or positioning the rear edge beneath the front edge of the second flap body part, the flap body part and the second flap body part can be integrated. Thus, it is possible to reduce a gap between the rear edge and the front edge and increase the pressure-receiving area of the whole rear flap. Consequently, it is possible to increase the lift during traveling on water.

(11) In some embodiments, in the rear flap configuration for an amphibious vehicle described in the above (10), the rear edge of the flap body part is vertically rotatably connected to the lower edge of the vehicle body, and the rear flap configuration further comprises a rotation mechanism configured to rotationally move the flap body part.

According to the embodiment described in the above (11), the rear edge of the flap body part is vertically rotatably connected to the lower edge of the vehicle body. Additionally, the rear flap configuration further comprises a rotation mechanism configured to rotationally move the flap body part. During traveling on water, the flap body part is rotationally moved downward by the rotation mechanism so that the flap body part receives water flow, causing lift. During traveling on land, the flap body part is rotationally moved upward so that the flap body part is moved to a position along the rear surface. Thus, it is possible to reduce a risk that the flap body part disturbs traveling on considerably rough ground during traveling on land.

Advantageous Effects

According to at least some embodiments of the present invention, there is provided a rear flap configuration for an amphibious vehicle that enables a rear flap to be mounted to a vehicle body, without forming a gap between a rear part of the vehicle body and the rear flap during traveling on water.

BRIEF DESCRIPTION OF DRAWINGS

FIG. 5 is a bottom view of a rear side of an amphibious vehicle according to still another embodiment of the present invention.

DETAILED DESCRIPTION

Figure 1A:
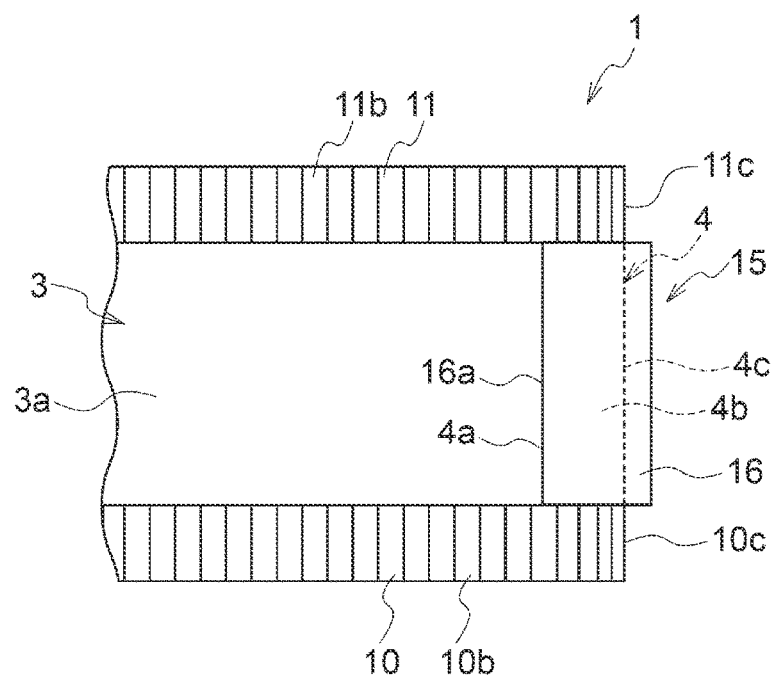
FIG. 1A is a bottom view of a rear side of an amphibious vehicle according to an embodiment of the present invention.

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Further, in the description below, some the same features are associated with the same reference numerals and not described again.

Figure 1B:
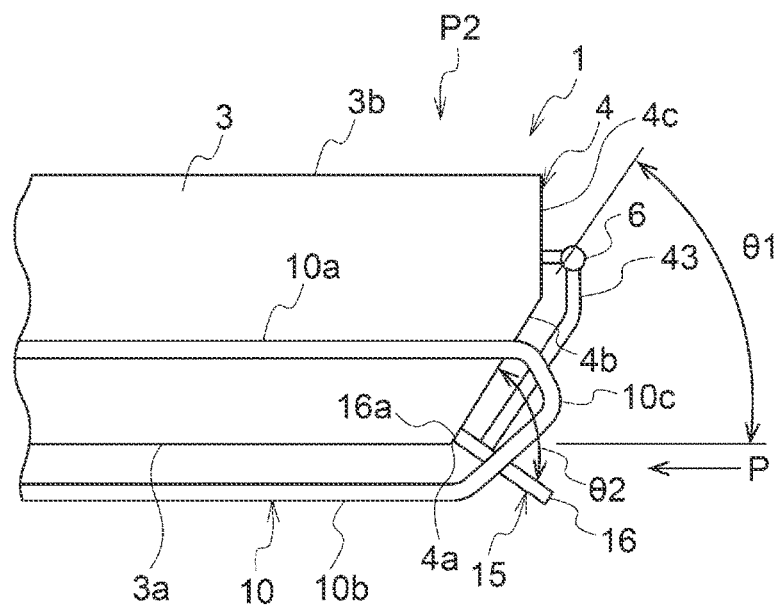
FIG. 1B is a side view of a rear side of an amphibious vehicle according to an embodiment of the present invention.

FIG. 1A is a bottom view of a rear side of an amphibious vehicle according to an embodiment of the present invention. FIG. 1B is a side view of a rear side of an amphibious vehicle according to an embodiment of the present invention.

A rear flap configuration of an amphibious vehicle 1 according to the present embodiment includes, as shown in FIGS. 1A and 1B, a vehicle body 3, a pair of crawlers 10, 11 disposed on both right and left sides of the vehicle body 3 with respect to a traveling direction of the vehicle body 3, and a rear flap 15 connected to a rear part of the vehicle body 3. The vehicle body 3 has a rear surface 4 including a departure angle surface 4b which extends obliquely upward from a lower edge 4a of the rear surface 4 as the vehicle body 3 extends rearward. The pair of crawlers 10, 11 has upper surfaces 10a, 11a positioned above the lower edge 4a and lower surfaces 10b, 11b positioned below the lower edge 4a. The pair of crawlers 10, 11 also has rear edges 10c, 11c projecting rearward from the lower edge 4a. The rear flap 15 includes a flap body part 16 having a facing edge 16a, which faces the lower edge 4a between the pair of crawlers 10, 11, and is vertically rotatably connected to the vehicle body 3 so as to allow the facing edge 16a to come into contact or close proximity with the lower edge 4a.

In the illustrated embodiment, the rear surface 4 of the vehicle body 3 has a rear surface upper part 4c extending vertically and a departure angle surface 4b extending downward from a lower end of the rear surface upper part 4c. The departure angle surface 4b extends obliquely upward at a departure angle θ1 from a rear end of a bottom surface 3a of the vehicle body 3. A lower end of the departure angle surface 4b forms the lower edge 4a which extends straight in a right-left direction of the vehicle body 3. The bottom surface 3a of the vehicle body 3 extends in a plane.

The rear flap 15 includes a flap body part 16 which has a plate-like shape and is formed into a rectangular shape in the bottom view of the vehicle body 3. The flap body part 16 is disposed between the pair of crawlers 10, 11 so as to be close to each of the pair of crawlers 10, 11. A front end of the flap body part 16 forms a facing edge 16a extending straight in a right-left direction of the vehicle body 3. In a state where the facing edge 16a is in contact or close proximity with the lower edge 4a of the rear surface 4 of the vehicle body 3, the flap body part 16 is arranged so as to be inclined downward.

The rear flap 15 is supported via an arm 43 having a first end rotatably connected to the vehicle body 3 and a second end connected to the flap body part 16 (see FIG. 1B). In the illustrated embodiment, an upper end of the arm 43 is rotatably connected to a shaft part 6 disposed on the rear surface upper part 4c of the rear surface 4, and a lower end of the arm 43 is fixed to the rear flap 15. The arm 43 can rotationally move in a vertical direction about the shaft part 6 via a driving source (not shown). The rotational movement of the arm 43 enables shifting between a position P with a predetermined flap angle θ2 in a state where the facing edge 16a of the flap body part 16 is in contact or close proximity with the lower edge 4a and a retraction position where the flap is retracted on an upper surface 3b of the vehicle body 3.

When the rear flap 15 is rotationally moved in a vertical direction with respect to the vehicle body 3 via the arm 43, the facing edge 16a of the flap body part 16 is brought into contact or close proximity with the lower edge 4a of the vehicle body 3 at a position between the pair of crawlers 10, 11. Thus, the flap body part 16 is not in contact with the crawlers 10, 11, which makes it possible to dispose the flap body part 16 on the rear surface 4 of the vehicle body 3 without a gap or in close proximity. Consequently, it is possible to dispose the rear flap 15 on the vehicle body 3 without forming a gap between the rear surface 4 of the vehicle body 3 and the rear flap 15 during traveling of the amphibious vehicle 1 on water, and thereby it is possible to reduce a risk of the reduction in lift of the rear flap 15 due to water flowing out from the gap.

Figure 2A:
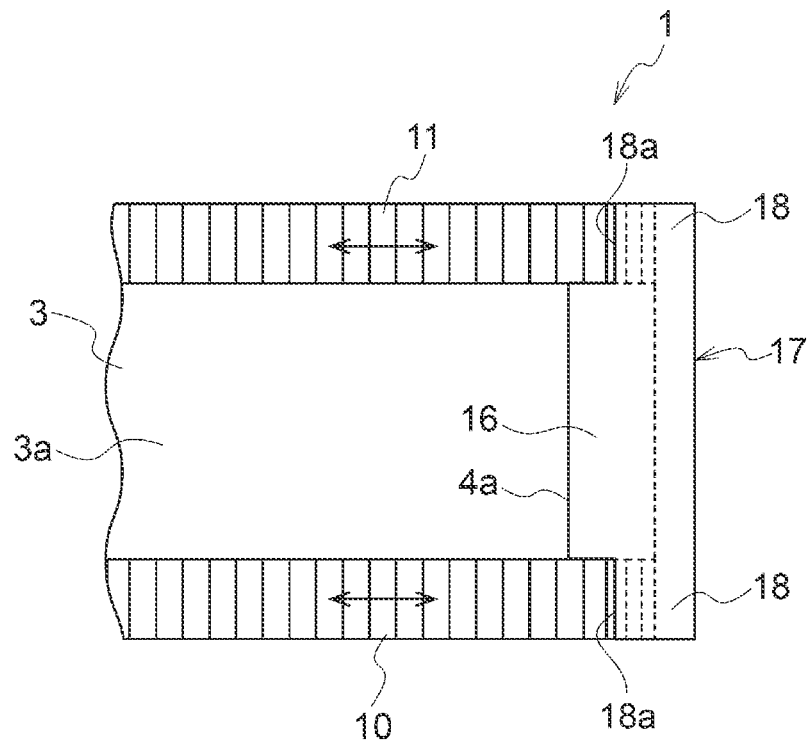
FIG. 2A is a bottom view of a rear side of an amphibious vehicle according to another embodiment of the present invention.
Figure 2B:
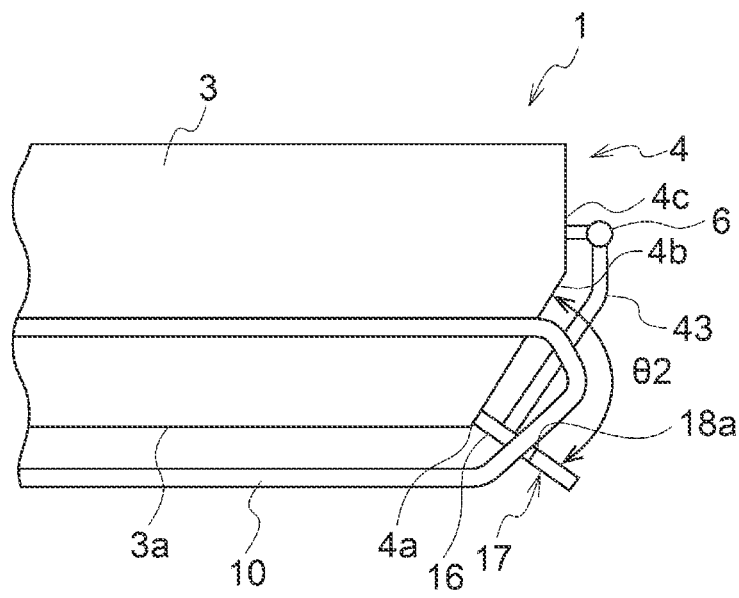
FIG. 2B is a side view of a rear side of an amphibious vehicle according to another embodiment of the present invention.
Figure 3:
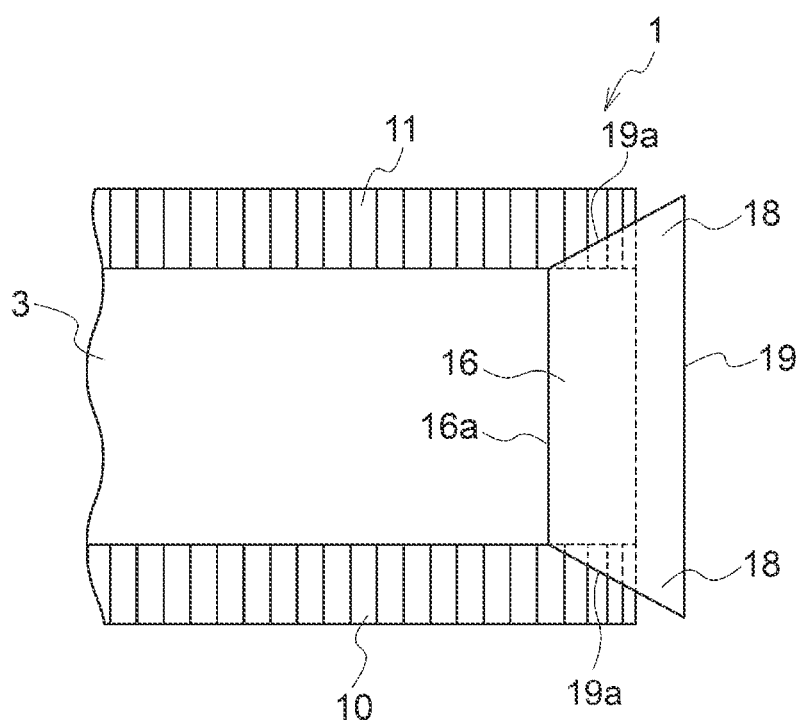
FIG. 3 is a bottom view of a rear side of an amphibious vehicle according to still another embodiment of the present invention.

FIG. 2A is a bottom view of a rear side of an amphibious vehicle 1 according to another embodiment of the present invention. FIG. 2B is a side view of a rear side of the amphibious vehicle 1 according to another embodiment of the present invention. FIG. 3 is a bottom view of a rear side of an amphibious vehicle 1 according to still another embodiment of the present invention.

As shown in FIGS. 2A and 2B, a rear flap 17 further includes second flap body parts 18 positioned behind the flap body part 16 and respectively having second facing edges 18a facing the pair of crawlers 10, 11, and is configured so as to allow the second facing edges 18a to come into contact or close proximity with the crawlers 10, 11. In the illustrated embodiment, the second flap body parts 18 are plate-like members projecting toward both right and left sides of the vehicle body 3 from the flap body part 16. The second flap body part 18 is shaped into a rectangular form in the bottom view so as to cover a corresponding crawler 10, 11 of the pair of crawlers 10, 11. A front end of the second flap body part 18 forms a second facing edge 18a extending in a direction orthogonal to a rotational direction of the crawler 10, 11.

Thus, when the second flap body part 18 is moved such that the second facing edge 18a comes into contact or close proximity with the crawler 10, 11, it is possible to eliminate a gap between the second flap body part 18 and the crawler 10, 11. Additionally, when the rear flap 17 further includes the second flap body part 18, it is possible to improve the lift generated by water flow along the bottom surface 3a of the vehicle body 3 that acts on the rear flap 17 during traveling on water.

Since the second facing edge 18a is oriented in a direction orthogonal to a rotational direction of the crawler 10, 11 while a rear part of the crawler 10, 11 is curved, it is possible to make a distance between the second facing edge 18a and the crawler 10, 11 in a longitudinal direction substantially constant. Thus, when the second facing edge 18a is more closely approximated to the crawler 10, 11, it is possible to eliminate a gap over the almost entire region in a longitudinal direction of the second facing edge 18a. Consequently, it is possible to reliably suppress water flowing out from the bottom surface 3a of the vehicle body 3 through a gap, during traveling on water.

The second flap body part 18 is not limited to a rectangular form in the bottom view of the vehicle body 3, and may be shaped in a triangular form as long as it can increase the pressure-receiving area of the rear flap 17. As shown in FIG. 3, a rear flap 19 including triangular second flap body parts 18 is formed in a trapezoid. In the illustrated embodiment, the length of a rear end of the rear flap 19 in the right-left direction is longer than the length of a front end thereof in the right-left direction. The triangular second flap body parts 18 are formed on both right and left sides of the rear flap 19. A second facing edge 19a of the second flap body part 18 extends in a direction intersecting with a rotational direction of the crawler 10, 11. In the illustrated embodiment, the second facing edge extends obliquely outward as it extends rearward.

Since a rear part of the crawler 10, 11 is curved, when the second facing edge 19a is oriented in a direction intersecting with a rotational direction of the crawler 10, 11, there is a risk that a distance between the second facing edge 19a and the crawler in a longitudinal direction is made irregular. Accordingly, when the direction of the second facing edge 19a is designed such that the distance between the second facing edge 19a and the crawler 10, 11 in a longitudinal direction is made substantially constant, it is possible to decrease the distance between the second facing edge 19a and the crawler 10, 11.

Figure 4A:
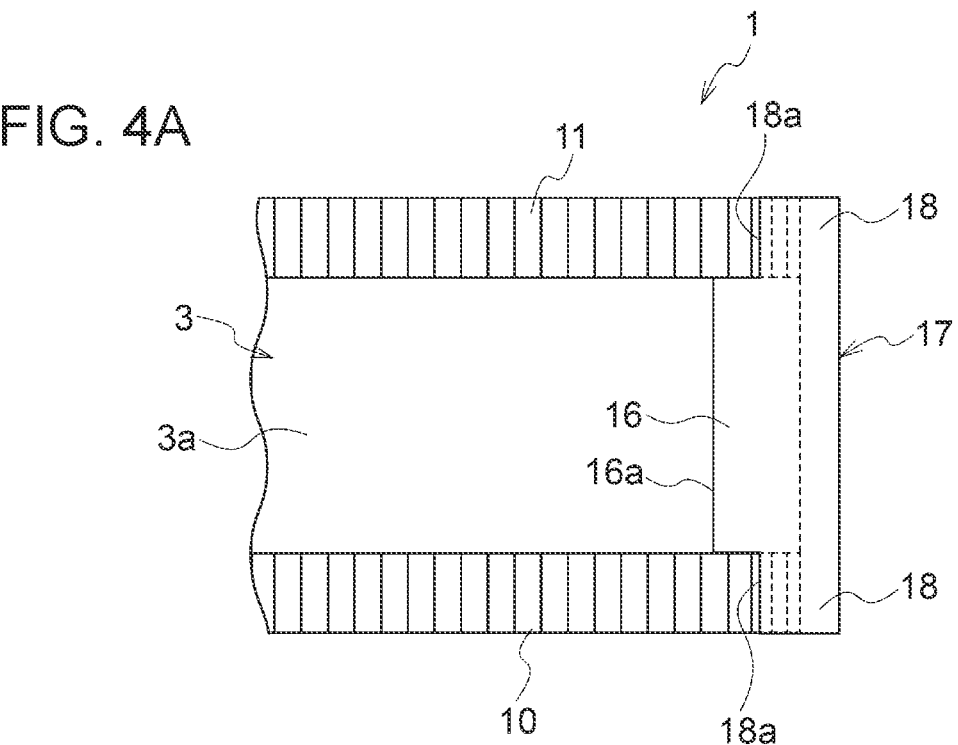
FIG. 4A is a bottom view of a rear side of an amphibious vehicle according to still another embodiment of the present invention.
Figure 4B:
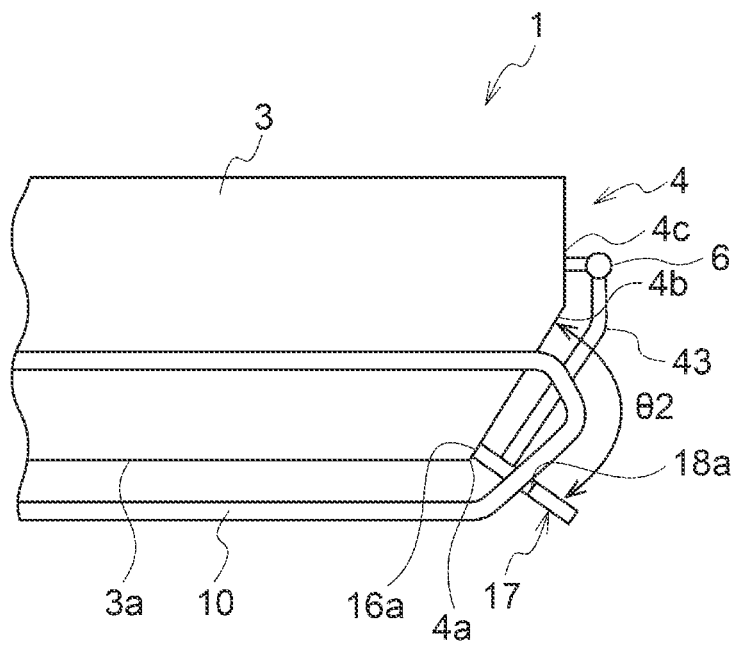
FIG. 4B is a side view of a rear side of an amphibious vehicle according to still another embodiment of the present invention.

FIG. 4A is a bottom view of a rear side of an amphibious vehicle 1 according to still another embodiment of the present invention. FIG. 4B is a side view of a rear side of the amphibious vehicle 1 according to still another embodiment of the present invention.

As shown in FIGS. 4A and 4B, in a state where the rear flap 17 is located at a position having a predetermined flap angle θ2 with respect to the rear surface 4 of the vehicle body 3, the facing edge 16a at a front end of the flap body part 16 is in contact with the lower edge 4a of the rear surface 4 of the vehicle body 3 without a gap, and the second facing edges 18a of the second flap body parts 18 are in close contact with the crawlers 10, 11 without a gap.

During traveling on water, the crawlers 10, 11 of the amphibious vehicle 1 are in a stop state. Accordingly, even if the second flap body parts 18 are disposed without a distance from the crawlers 10, 11, there is no risk that the second flap body part 18 is damaged. Thus, it is possible to prevent water flowing along the bottom surface 3 of the vehicle body 3 and then flowing out through a gap (gap between the rear surface 4 of the vehicle body 3 and the front end of the flap body part 16, and gaps between the second flap body parts 18 and the crawlers 10, 11) during traveling on water. It is possible to further increase the lift by the rear flap 17.

FIG. 5 is a bottom view of a rear side of an amphibious vehicle 1 according to still another embodiment of the present invention. As shown in FIG. 5, the second flap body parts 18 of a rear flap 23 are configured so as to include extension parts 19 extending to outside of the pair of crawlers 10, 11 on both right and left sides. In the illustrated embodiment, the extension part 18b is shaped into a rectangular form extending in a front-rear direction, in the bottom view of the vehicle body 3. Forming such extension parts 18b increases the pressure-receiving area of the rear flap 23 on which water flow is received.

Figure 6A:
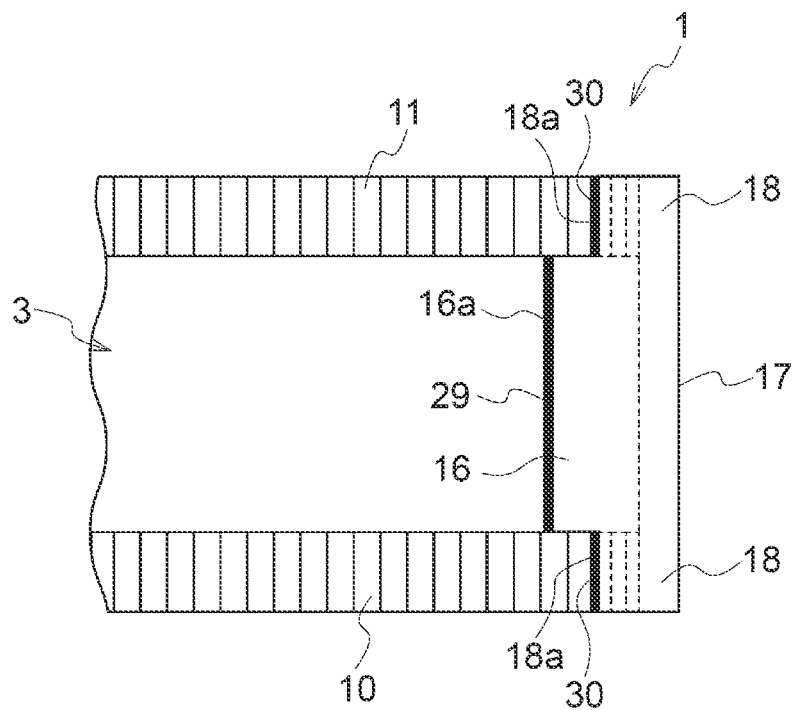
FIG. 6A is a bottom view of a rear side of an amphibious vehicle according to another embodiment of the present invention.
Figure 6B:
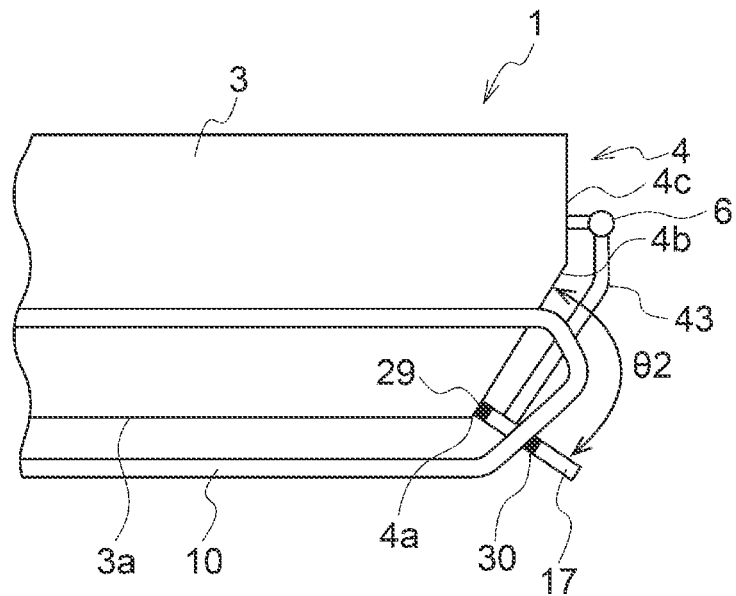
FIG. 6B is a side view of a rear side of an amphibious vehicle according to still another embodiment of the present invention.

FIG. 6A is a bottom view of a rear side of an amphibious vehicle 1 according to still another embodiment of the present invention. FIG. 6B is a side view of a rear side of the amphibious vehicle 1 according to still another embodiment of the present invention.

As shown in FIGS. 6A and 6B, a front end of the flap body part 16 of the rear flap 17 is provided with an elastic member 29 (e.g., rubber). The elastic member 29 is formed such that, when the rear flap 17 is moved to a position having a predetermined flap angle θ2 with respect to the rear surface 4 of the vehicle body 3, a gap between the lower edge 4a of the rear surface 4 of the vehicle body 3 and the facing edge 16a of the flap body part 16 is filled with the elastic member 29. Additionally, front ends of the second flap body parts 18 are provided with elastic members 30. The elastic member 30 is formed such that, when the rear flap 17 is moved to a position having a predetermined flap angle θ2 with respect to the rear surface 4 of the vehicle body 3, a gap between the bottom surface of the crawler 10, 11 and the second facing edge 18a of the second flap body part 18 is filled with the elastic member 30.

The elastic member 29 disposed at the front end of the flap body part 16 and the elastic members 30 disposed at the front ends of the second flap body parts 18 are formed in straight. These elastic members 29, 30 reliably eliminate gaps and reliably suppress the occurrence of water flow out from a gap between the flap body part 16 and the rear surface 4 of the vehicle body 3 and a gap between the second flap body part 18 and the crawler 10, 11, during traveling on water.

Figure 7:
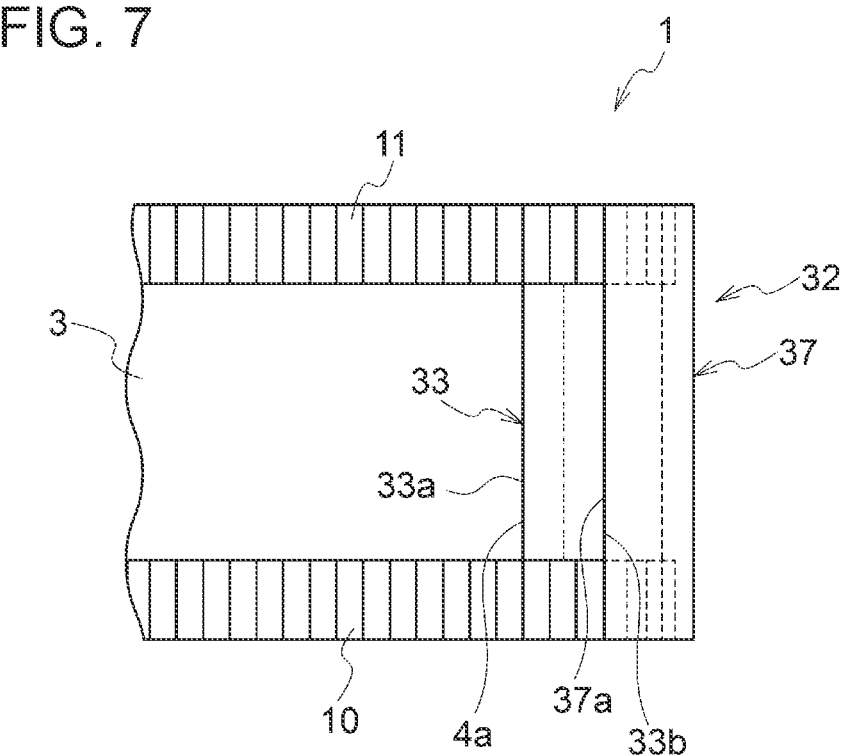
FIG. 7 is a bottom view of a rear side of an amphibious vehicle according to still another embodiment of the present invention.
Figure 8A:
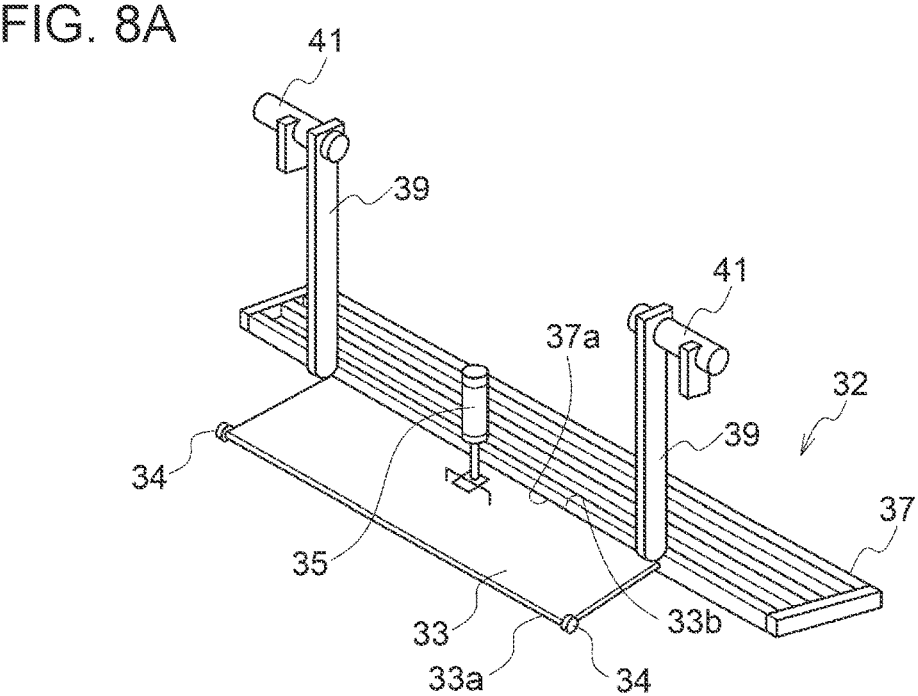
FIG. 8A is a perspective view of a flap body part and a second flap body part according to the embodiment shown in FIG. 7.
Figure 8B:
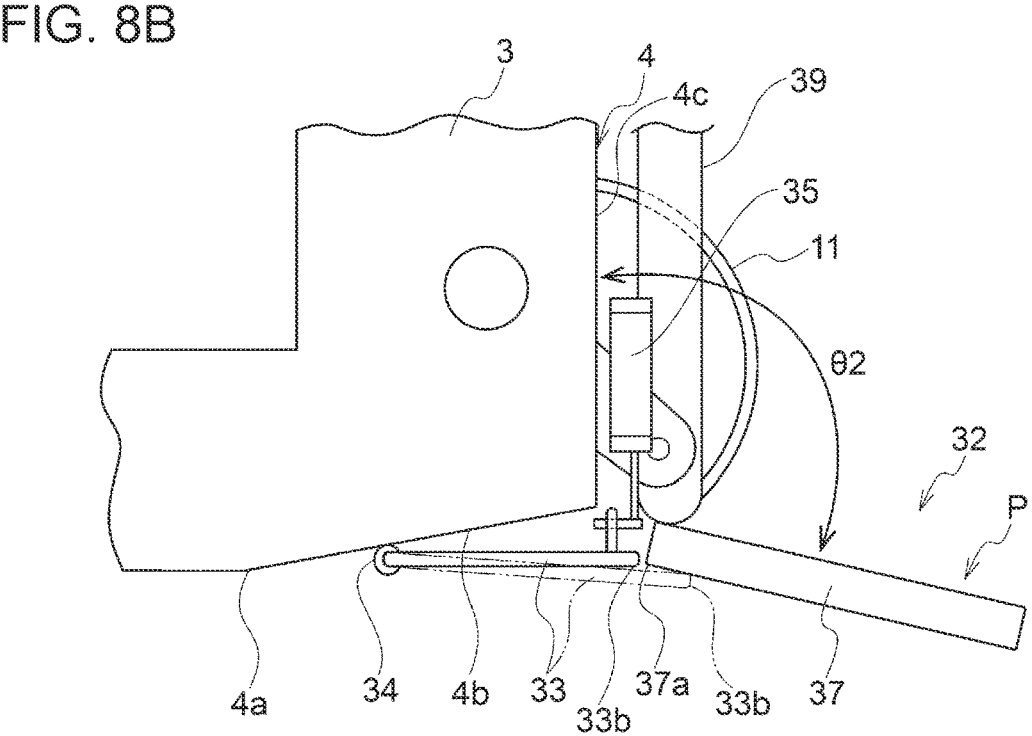
FIG. 8B is a partial side view of a rear side of the amphibious vehicle including the flap body part and the second flap body part shown in FIG. 8A.
Figure 9:
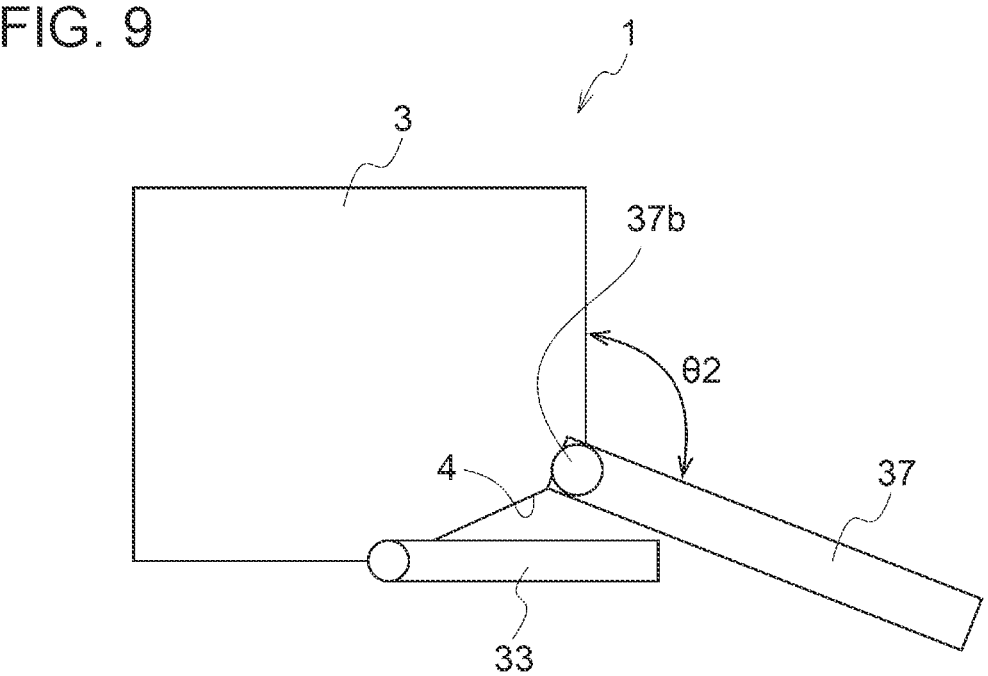
FIG. 9 is a partial schematic side view of a rear side of an amphibious vehicle according to still another embodiment of the present invention.

FIG. 7 is a bottom view of a rear side of an amphibious vehicle 1 according to another embodiment of the present invention. FIG. 8A is a perspective view of a flap body part 33 and a second flap body part 37 according to the embodiment shown in FIG. 7. FIG. 8B is a partial side view of a rear side of the amphibious vehicle 1 including the flap body part 33 and the second flap body part 37 shown in FIG. 8A. FIG. 9 is a partial schematic side view of a rear side of an amphibious vehicle 1 according to still another embodiment of the present invention.

As shown in FIGS. 7, 8A, and 8B, the second flap body part 37 of the rear flap 32 is configured separately from the flap body part 33, and a rear edge 33b positioned opposite to a facing edge 33a of the flap body part 33 and a front edge 37a of the second flap body part 37 facing the rear edge 33b can come into contact or close proximity with each other. Additionally, the rear edge 33b of the flap body part 33 is vertically rotatably connected to the lower edge 4a of the vehicle body 3, and a rotation mechanism 35 configured to rotationally move the flap body part 33 is further provided. Additionally, an arm 39 having a first end rotatably connected to the vehicle body 3 and a second end connected to the second flap body part 37 is further provided.

In the illustrated embodiment, the flap body part 33 is vertically rotatably supported on the departure angle surface 4b, via hinges 34 disposed on both right and left sides of its front end, and extends along the departure angle surface 4b. To a rear side of a middle portion of the flap body part 33 in a right-left direction, a rod-side end portion of the rotation mechanism 35 (hydraulic cylinder), which is oriented in a vertical direction and mounted to a rear part of the vehicle body 3, is pivotally connected. Thus, if the rotation mechanism 35 (hydraulic cylinder) expands, the flap body part 33 is rotationally moved downward; whereas if the rotation mechanism 35 contracts, the flap body part 33 is rotationally moved upward and thereby shifted to a retraction position along the departure angle surface 4b.

The second flap body part 37 is shaped into a rectangular form in the bottom view and extend in a right-left direction of the vehicle body 3 so as to intersect with the pair of crawlers 10, 11. When the second flap body part 37 is moved to a position having a predetermined flap angle θ2 with respect to a rear part of the vehicle body 3, the front edge 37a of the second flap body part 37 is positioned close to the rear edge 33b of the flap body part 33. The front edge 37a of the second flap body part 37 may be positioned so as to be in contact with the rear edge 33b of the flap body part.

A front side of a middle portion of the second flap body part 37 in a right-left direction is provided with a pair of arms 39 formed to stand upright with a distance in a right-left direction. An upper end of each of the arms 39 is rotatably supported to a shaft portion 41 extending in a vehicle body width direction at a rear part of the vehicle body 3. Thus, these arms 39 are supported in a vertically rotatable manner about the shaft portions 41 by a driving source (hydraulic cylinder) (not shown). With this driving source, the second flap body part 37 can be moved, via the arms 39, between a retraction position where the second flap body part 37 is retracted on an upper surface of a rear part of the vehicle body 3 and a position P having a predetermined flap angle θ2 with respect to a rear part of the vehicle body 3.

The rear flap 32 with such a structure allows the flap body part 33 to be moved downward and the second flap body part 37 to be moved to the position P having a predetermined flap angle θ2 with respect to a rear part of the vehicle body 3 during traveling on water, thereby increasing the pressure-receiving area of water flow by the flap body part 33 and the second flap body part 37. Thus, it is possible to further increase the lift.

During traveling on land, the flap body part 33 is turned upward so as to move to a position along the departure angle surface 4b, and the second flap body part 37 is retracted on a rear side upper surface of the vehicle body 3. Thus, during traveling of the amphibious vehicle 1 on land, there is no risk of disruption by the flap body part 33 and the second flap body part 37, and it is possible to travel on considerably rough ground.

Further, separately providing the second flap body part 37 besides the flap body part 33 saves the weight, facilitates the movement of the second flap body part 37, and downsizes the driving source for moving the second flap body part 37, compared with a case where the flap body part 33 and the second flap body part are integrated.

The flap body part 33 may be configured, as shown by the long-dashed double-short-dashed line in FIG. 8B, such that the rear edge 33b is positioned beneath the front edge 37a of the second flap body part 37.

Additionally, as shown in FIG. 9, the second flap body part 37 may be configured such that its front end 37b is rotatably supported on an upper part of the departure angle surface 4b. In this case, during traveling on land, the second flap body part 37 is retracted in a state it has been turned upward and oriented upward with respect to a rear part of the vehicle body 3. During traveling on water, the second flap body part 37 is moved to a position having a predetermined flap angle θ2 with respect to a rear part of the vehicle body 3. In the illustrated embodiment, during traveling on water, a lower surface of the second flap body part 37 is positioned in contact with a front end of the flap body part 33. This eliminates the occurrence of a gap between the lower surface of the second flap body part 37 and the front end of the flap body part 33. In the above-described embodiments, the rear flap 15, 17, 19, 23, 32 can read a trimtub.

The embodiments of the present invention have been described above. However, the present invention is not limited thereto, and various modifications may be applied as long as they do not depart from the object of the present invention.

REFERENCE SIGNS LIST

1 Amphibious vehicle
3 Vehicle body
4 Rear surface
4a Lower edge
4b Departure angle surface
4c Rear surface upper part
6, 41 Shaft part
10, 11 Crawler
10a, 11a Upper surface
10b, 11b Lower surface
15, 17, 19, 23, 32 Rear flap
16, 33 Flap body part
16a, 33a Facing edge
18, 37 Second flap body part
18a, 19a Second facing edge
18b Extension part
29, 30 Elastic member
33b Rear edge
34 Hinge
35 Rotation mechanism
39, 43 Arm
P Position
P2 Retraction position
θ1 Departure angle
θ2 Flap angle

The invention claimed is:

1. A rear flap configuration for an amphibious vehicle comprising:
   a vehicle body;
   a pair of crawlers disposed on both right and left sides of the vehicle body with respect to a traveling direction of the vehicle body; and
   a rear flap connected to a rear part of the vehicle body,
   the vehicle body having a rear surface including a departure angle surface which extends obliquely upward from a lower edge of the rear surface as the vehicle body extends rearward,
   the pair of crawlers having an upper surface positioned above the lower edge and a lower surface positioned below the lower edge, the pair of crawlers having a rear edge projecting rearward from the lower edge,
   the rear flap including a flap body part having a facing edge which faces the lower edge between the pair of crawlers, the rear flap being vertically rotatable connected to the vehicle body so as to allow the facing edge to come into contact or close proximity with the lower edge,
   wherein the rear flap further includes a second flap body part positioned behind the flap body part and having second facing edges respectively facing the pair of crawlers, and the rear flap is configured so as to allow the second facing edges to come into contact or close proximity with the crawlers.

2. The rear flap configuration for an amphibious vehicle according to claim 1,
   wherein the second facing edges extend in a direction orthogonal to a rotational direction of the crawlers.

3. The rear flap configuration for an amphibious vehicle according to claim 1,
   wherein the second facing edges extend in a direction intersecting with a rotational direction of the crawlers.

4. The rear flap configuration for an amphibious vehicle according to claim 1,
wherein the second flap body part includes extension parts extending to outside of the pair of crawlers on both right and left sides.

5. The rear flap configuration for an amphibious vehicle according to claim 1, further comprising an arm having a first end rotatably connected to the vehicle body and a second end connected to the flap body part.

6. The rear flap configuration for an amphibious vehicle according to claim 1,
wherein the second flap body part is formed separately from the flap body part, and
wherein the rear flap configuration further comprises an arm having a first end rotatably connected to the vehicle body and a second end connected to the second flap body part.

7. The rear flap configuration for an amphibious vehicle according to claim 5,
wherein the rear flap includes an elastic member disposed along the facing edge, and
wherein the elastic member is configured such that the facing edge comes into contact with the lower edge via the elastic member when the rear flap is moved to a position having a predetermined flap angle with respect to a rear surface of the vehicle body.

8. The rear flap configuration for an amphibious vehicle according to claim 6,
wherein the second flap body part of the rear flap includes elastic members disposed along the second facing edges, and
wherein the elastic members are configured such that the second facing edges come into contact with the crawlers via the elastic members when the second flap body part is moved to a position having a predetermined flap angle with respect to a rear surface of the vehicle body.

9. The rear flap configuration for an amphibious vehicle according to claim 6,
wherein a rear edge of the flap body part positioned opposite to the facing edge is configured to come into contact or close proximity with a front edge of the second flap body part facing the rear edge, or the rear edge is configured to be positioned beneath the front edge of the second flap body part.

10. The rear flap configuration for an amphibious vehicle according to claim 9,
wherein the rear edge of the flap body part is vertically rotatably connected to the lower edge of the vehicle body, and
wherein the rear flap configuration further comprises a rotation mechanism configured to rotationally move the flap body part.

11. The rear flap configuration for an amphibious vehicle according to claim 1,
wherein the rear flap includes an elastic member disposed along the facing edge, and
wherein the elastic member is configured such that the facing edge comes into contact with the lower edge via the elastic member when the rear flap is moved to a position having a predetermined flap angle with respect to a rear surface of the vehicle body.

12. The rear flap configuration for an amphibious vehicle according to claim 1,
wherein the second flap body part of the rear flap includes elastic members disposed along the second facing edges, and
wherein the elastic members are configured such that the second facing edges come into contact with the crawlers via the elastic members when the second flap body part is moved to a position having a predetermined flap angle with respect to a rear surface of the vehicle body.

13. The rear flap configuration for an amphibious vehicle according to claim 1,
wherein a rear edge of the flap body part positioned opposite to the facing edge is configured to come into contact or close proximity with a front edge of the second flap body part facing the rear edge, or the rear edge is configured to be positioned beneath the front edge of the second flap body part.

* * * * *